United States Patent [19]

Lynam

[11] Patent Number: 5,076,674
[45] Date of Patent: Dec. 31, 1991

[54] REDUCED FIRST SURFACE REFLECTIVITY ELECTROCHROMIC/ELECTROCHEMICHROMIC REARVIEW MIRROR ASSEMBLY

[75] Inventor: Niall R. Lynam, Holland, Mich.

[73] Assignee: Donnelly Corporation, Holland, Mich.

[21] Appl. No.: 491,447

[22] Filed: Mar. 9, 1990

[51] Int. Cl.$^5$ .......................... G02F 1/01; G02B 5/08
[52] U.S. Cl. ................................. 359/274; 359/267; 359/884; 359/603
[58] Field of Search ............................. 350/357, 642

[56] References Cited

U.S. PATENT DOCUMENTS

| | | | |
|---|---|---|---|
| 3,185,020 | 5/1965 | Thelen | 350/164 |
| 3,280,701 | 10/1966 | Donnelly et al. | 350/357 |
| 3,432,225 | 3/1969 | Rock | 350/164 |
| 3,443,859 | 5/1969 | Rogers | 350/331 R |
| 3,736,047 | 5/1973 | Gelber et al. | 350/331 R |
| 3,781,090 | 12/1973 | Sumita | 350/164 LC |
| 3,806,229 | 4/1974 | Schoot et al. | 350/160 LC |
| 3,869,196 | 3/1975 | Kubota | 350/160 LC |
| 4,338,000 | 7/1982 | Kamimori et al. | 350/357 |
| 4,408,837 | 10/1983 | Kozaki et al. | 350/357 |
| 4,435,048 | 3/1984 | Kamimori et al. | 350/357 |
| 4,446,171 | 5/1984 | Thomas | 427/160 |
| 4,465,339 | 8/1984 | Baucke et al. | 350/357 |
| 4,505,538 | 3/1985 | Toussaint et al. | 350/357 |
| 4,521,078 | 6/1985 | Baeger | 350/334 |
| 4,521,079 | 6/1985 | Leenhouts et al. | 350/339 R |
| 4,529,272 | 7/1985 | Kruger et al. | 350/339 R |
| 4,556,288 | 12/1985 | Sekimura | 350/339 R |
| 4,572,619 | 2/1986 | Reininger et al. | 350/392 |
| 4,671,619 | 6/1987 | Kamimori et al. | 350/357 |
| 4,676,601 | 6/1987 | Itoh et al. | 350/331 R |
| 4,793,669 | 12/1988 | Perilloux | 350/1.6 |
| 4,921,331 | 5/1990 | Nakajima | 350/642 |

FOREIGN PATENT DOCUMENTS

| | | |
|---|---|---|
| 79044 | 11/1982 | European Pat. Off. |
| 240226 | 10/1987 | European Pat. Off. |
| 2732727 | 3/1978 | Fed. Rep. of Germany |
| 61-7803 | 1/1986 | Japan |

OTHER PUBLICATIONS

Preamble to Amendment to Motor Vehicle Safety Standard No. 205—Glazing Materials (Notice 3), Jun. 21, 1972.

Silica Low-Reflection Coatings for Collector Covers, by A Dip-Coating Process, Cathro et al., Solar Energy, vol. 32, No. 5, pp. 573-579, 1984.

Antireflective Effects on a Soda-Lime Glass Induced by Ar+ Implantation, Geotti-Bianchini et al., Journal of the American Ceramic Society, vol. 67, No. 1, Jan. 1984.

Integral Antireflection Films for Glasses: A Review, Ford et al., Glass Technology, vol. 26, No. 2, Apr. 1985.

Single-Layer, Gradient Refractive Index Antireflection Films, Effective from 0.35 to 2.5 Microns, Minot, Journal of the Optical Society of America, vol. 66, No. 6, Jun. 1976.

Electrochromic Automotive Day/Night Mirrors, Lynam, SAE Technical Paper Series, 870636, Feb. 23-27, 1987.

*Primary Examiner*—Rolf Hille
*Assistant Examiner*—Robert P. Limanek
*Attorney, Agent, or Firm*—Price, Heneveld, Cooper, DeWitt & Litton

[57] ABSTRACT

A reduced first surface reflectivity electrochromic-/electrochemichromic rearview mirror assembly provides improved glare reduction and substantially less noticeable double imaging. Preferably, the assembly includes an anti-reflective layer or coating on the outermost, front surface of the front glass substrate/panel. The coating can be a single thin film or a multiple layer thin film stack of suitable durability and index of refraction. Alternately, a gradient refractive index layer produced by surface leaching, dip coating and heating, or ion implantation may be used. The invention is especially useful in electrochemichromic mirror assemblies having a laminated front glass where unwanted total reflection and double imaging could otherwise be pronounced because of opportunities for nonparallel attachment of the multiple glass substrates.

44 Claims, 5 Drawing Sheets

SODA LIME GLASS

FIG. 7

SINGLE LAYER AR COATING

BI-LAYER AR STACK

FIG. 11

TRI-LAYER AR STACK

REDUCED FIRST SURFACE REFLECTIVITY ELECTROCHROMIC/ELECTROCHEMICHROMIC REARVIEW MIRROR ASSEMBLY

BACKGROUND OF THE INVENTION

This invention relates to glare reducing rearview mirror assemblies for use in vehicles and, more particularly, to an electrochromic/electrochemichromic rearview mirror assembly having spaced substrate panels which provides reduced glare reflection and thus improved glare reduction as well as substantially less noticeable double imaging in both interior and exterior vehicle applications.

Recent advancements in rear vision systems for vehicles include electro-optic rearview mirrors having an electrically activated medium which darkens to reduce glare in response to bright lights sensed from the rear of the vehicle. Although single substrate forms of such rearview mirrors are known, a more typical, conventionally known version is shown at 10 in FIG. 1. Prior known rearview mirror 10 consists of two planar substrates 11, 12 which are usually formed from glass although other optically transparent panels such as polycarbonate, acrylic and the like can also be used. Panels 11, 12 are spaced apart by a sealing material 14 defining a cell cavity 15 between the rear surface of front panel 11 and the front surface of rear panel 12. Transparent, electrically conductive coatings 16, 17, usually indium-tin oxide or an equivalent, are typically coated on those facing surfaces prior to assembly. In addition, the rearmost surface 19 of substrate 12 typically includes a reflector coating 20 of silver, aluminum, chromium or like metal, followed by a scattering preventing layer 21 of tape, plastisol or the like.

Figures 1, 4, 5, 6:
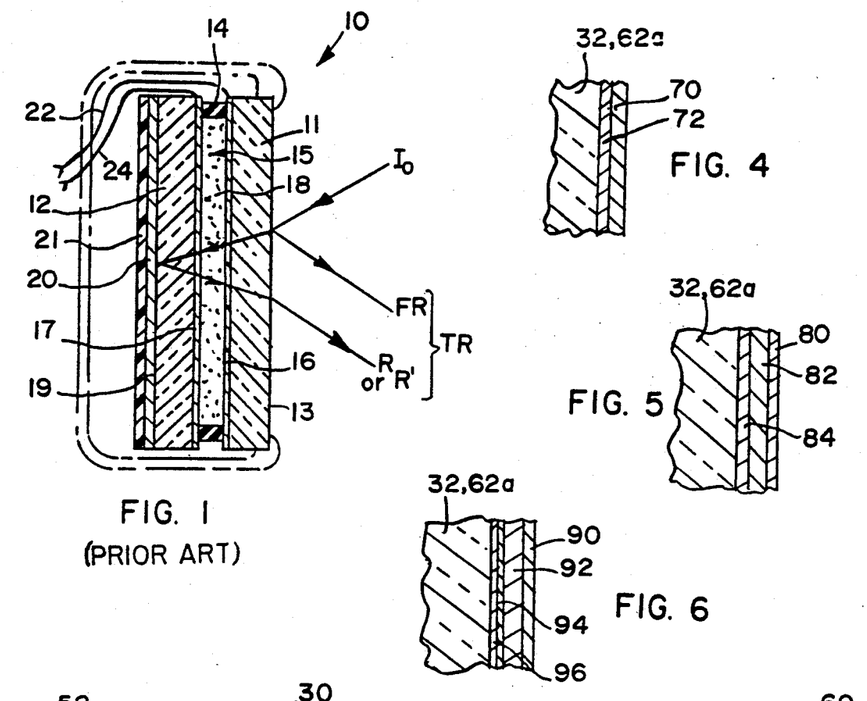
FIG. 1 is a sectional side elevation of a conventionally known, prior art electro-optic rearview mirror assembly illustrating typical principal and first surface reflected images.
FIG. 4 is a fragmentary, sectional view of a portion of the outermost substrate element of the rearview mirror of the present invention incorporating a double layer thin film stack.
FIG. 5 is a fragmentary, sectional view of a portion of the outermost substrate element of the present invention incorporating a triple layer thin film stack.
FIG. 6 is a fragmentary, sectional view of a portion of the outermost substrate element of the present invention incorporating a four layer thin film stack.

In this conventionally known assembly, cavity 15 is typically filled with an electro-optic material 18 such as a liquid crystal, liquid or gel electrochromic or like medium. When no electrical voltage is applied across electrical leads 22, 24 which are connected to conductive layers 16, 17, the electro-optic material is optically clear and transparent. Hence, incident light ($I_o$) enters through substrate panel 11, passes through cell cavity 15, electro-optic material 18, transparent conductive coatings 16, 17, rear panel 11 and reflects off layer 20 after which it is retransmitted through electro-optic medium 18, rear and front substrates 12, 11 and coatings 16, 17 to form reflected image R. Typically, reflected image R is 50 to 90% of the incident light intensity $I_o$ depending on the nature and quality of reflective layer 20. However, when suitable electric voltage is applied to leads 22, 24, electro-optic medium 18 in cavity 15 is darkened such that incident light $I_o$ is attenuated by that medium, is reflected off layer 20, and is further attenuated in intensity during its second pass through medium 18 and out through front panel 11 to form dimmed image R'. Thus, when voltage is applied to electro-optic medium 18, the attenuated reflected image R' is usually 1 to 5% of the intensity of incident light $I_o$.

In addition to the principal full or dimmed reflected image R or R', an observer of rearview mirror assembly 10 will also see a second image FR due to reflection from the front surface 13 of front substrate 11. First surface reflection FR is a natural consequence of the difference between the refractive index of the incident medium, in this case air with an index of 1, and the refractive index of the material from which the surface 1 is composed, in this case soda lime glass having a refractive index of about 1.52 (measured at sodium D line). The reflectivity R for a bare dielectric surface such as soda lime glass at normal (as opposed to oblique) incidence is given by the Fresnel coefficient:

$$R = 1 - T = \frac{(n_o - n_s)^2}{(n_o + n_s)^2}$$

where $n_o$ is the refractive index of the incident medium, which is usually air, and $n_s$ is the refractive index of the substrate. If light is obliquely incident, then the above equation still applies if the appropriate effective index is used in place of $n_o$ and $n_s$. Thus, first surface reflection FR from such a glass substrate is about 4% using the above equation. Total reflectivity TR as seen by an observer of assembly 10 will include the sum of the first surface reflection FR and either the full or dimmed mirror reflection R or R', depending on whether the electro-optic mirror is unactivated and dimmed.

Use of known electro-optic rearview mirrors such as assembly 10 creates three problems with respect to the viewed reflection. First, no matter how dark the electro-optic material becomes, total reflectivity TR cannot be less than 4%, i.e., the 4% from first surface reflection FR. Hence, very intense headlights or similar intense light sources around the vehicle in which the rearview mirror system is being used, have the potential to continue to at least partially produce vision impairing glare despite even total elimination of the reflectance from the mirror reflector 20 due to dimming of electro-optic material 18 in cavity 15.

Secondly, if front surface 13 and rear surface 19 of substrate 12 on which reflector layer 20 is placed are not perfectly parallel, then the first surface reflectance image FR will not superimpose with the reflected image from mirror surface 20. Thus, a double image is formed where an observer would see both R or R' and FR. This double image will be particularly noticeable when the two images are close in intensity, i.e., when FR is about 4% and when R' is between 1 and 5% as is common when electro-optic material 18 is activated to its dimmed state.

Thirdly, if glass substrates 11, 12 are relatively thick, i.e., 2 millimeters or so, the double image of FR and R or R' will be particularly discernible when the assembly is viewed from an oblique angle.

Of course, other surfaces such as the rear surface of front panel 11 and the front surface of rear panel 12 can potentially contribute reflections in addition to first surface reflection FR and mirror reflection R or R'. However, the refractive index of electro-optic material 18, along with the refractive index of any coatings 16, 17 used on those additional surfaces, can be specified to be sufficiently close to that of substrates 11, 12 so as to sufficiently weaken the intensity of such additional reflectance to avoid problems from additional double imaging or significant contribution to overall total reflectance TR.

In addition to the above, it has been discovered that the above problems are more pronounced when front substrate panel 11 is replaced with a laminate front assembly for safety and other reasons as described in co-pending, commonly assigned, U.S. patent application Ser. No. 07/464,888, filed by me on Jan. 16, 1990, entitled "ANTI-SCATTER, ULTRAVIOLET PROTECTED, ANTI-MISTING, ELECTRO-OPTICAL REARVIEW MIRROR," the disclosure of which is hereby incorporated by reference. In such an assembly, inclusion of two adhered or laminated substrate panels in front of the electro-optic medium creates an additional opportunity for slight misalignment or nonparallelism between the front surface of the assembly and the mirror reflectance surface somewhere to the rear in the assembly. Hence, the problems of less efficient glare reduction and double imaging can be even more pronounced.

In addition, inefficient glare reduction and double imaging can also be more pronounced in electrochromic or electrochemichromic mirror assemblies using a liquid or gel medium in the cavity between the spaced substrates as in FIG. 1 as contrasted with solid-state, single substrate electrochromic assemblies or light scattering liquid crystal mirror assemblies. In the solid-state, single substrate assemblies, the parallel relationship of the front surface and the rear reflector surface can be easily controlled when forming the single substrate. In the liquid crystal assemblies, light is scattered when the liquid crystal layer is activated, as opposed to being absorbed by a darkened layer, tending to reduce the glare and double imaging more naturally.

Prior efforts to solve these glare and double imaging problems have been made such as in Japanese Patent Publication 61-7803 of Jan. 14, 1986, entitled "NON-GLARING TYPE REFLECTING MIRROR." Such assembly provides a prismatic, laminated front glass piece in a liquid crystal mirror assembly where the front surface is purposely set at an angle to the rear surface of the front substrate. In such case, front surface reflected image FR is diverted at a significant angle with respect to the principal reflected image R to avoid the double imaging described above. This concept of purposeful divergence of reflected images using a prismatic element is well-known in mechanical day/night type rearview mirrors.

However, the prismatic front piece in electro-optic mirror assemblies has several drawbacks. Such prismatic front piece assemblies are difficult to use on outside mirrors due to the viewing angles involved and increase the overall device weight and thickness due to the need for a wedge-shaped glass element. In addition, prismatic front pieces are impractical for use on mirrors of compound curvature such as convex outside mirrors now commonly installed on vehicles for increased viewing range, and are very expensive to manufacture, especially for large area mirrors such as outside truck mirrors, and for mirrors requiring a variety of mirror shapes. Varying shapes would require a wide range of individual prismatic elements and necessitate large fabrication costs Accordingly, the need was apparent for an improved electro-optic rearview mirror assembly, especially of the electrochemichromic variety, wherein the problems of low end reflectance limitations and of double imaging found in prior known mirror assemblies are reduced or eliminated.

SUMMARY OF THE INVENTION

The present invention provides a reduced first surface reflectivity electrochromic/electrochemichromic rearview mirror assembly providing improved glare reduction through reduced total reflection in the low end, dimmed state and substantially less noticeable double imaging.

In one form, the reduced first surface reflectivity electrochromic/electrochemichromic rearview mirror assembly includes first and second spaced, optically transparent elements mounted in a mirror case. The elements each have front and rear surfaces which define a space between the rear surface of the first element and the front surface of the second element. An electrochromic/electrochemichromic medium is confined in the space, such medium having a light transmittance which is variable upon the application of an electric field thereto. Means are provided for applying an electric field to the electrochromic/electrochemichromic medium to cause variation in the light transmittance of the medium. A reflective coating on one surface of the second element reflects light incident thereon through the first element and the electrochromic/electrochemichromic medium. An anti-reflective means is included on the front surface of the first element for substantially reducing reflection from the front surface of the first element whereby the assembly provides lower total reflectivity and reduced double imaging.

In preferred forms of the invention, the anti-reflective means may be an optical thin film, a multiple layer coating, or a gradient refractive index film. For example, the optical thin film may be selected from the group consisting of magnesium fluoride and cryolite.

Alternately, the multiple layer coating may include a thin film stack having two, three, four or more layers. In the two layer stack, the outermost layer has an index of refraction lower than the innermost layer. A specific form may include magnesium fluoride as the outermost layer and silicon monoxide as the innermost layer. Similarly, the three and four layer thin film stacks may be formed from layers having varying indices of refraction and thicknesses and may be formed from various metal oxides and the like.

In the case of the gradient refractive index film, such film may be included on the front, or on both the front and rear surfaces of the front substrate panel and may be formed in various ways. For example, the surface may be a leached layer having an index of refraction intermediate that of air and soda lime glass. Alternately, the layer may be a porous, skeletonized surface coating formed from a dispersion including a solution having at least on metallo-organic compound and at least one organic polymer, the dispersion being heated after application to the substrate to drive off the solvent, the organic components and the organic polymer to leave an inorganic oxide film. In addition, the gradient refractive index layer may be induced on the element surface by argo ion implantation.

In another form of the invention, the front substrate may be formed as a laminate assembly including a pair of optically transparent panels adhered to one another by a highly light transmitting interlayer. The interlayer may be a polymer layer or a highly transparent, adhesive layer having a moderate to low modulus of elasticity. The refractive index of the interlayer is specified to closely match that of the optically transparent panels laminated thereby. Further, the laminate front element may include ultraviolet radiation reducing means for reducing ultraviolet radiation degradation of the electrochromic/electrochemichromic medium in the assembly. The same optical thin films, multiple layer coatings, and gradient refractive index films described above may be used on the front surface of the laminate front assembly to provide the anti-reflective effects in this form of the invention.

The invention provides significant glare and double image reducing advantages for all types of electrochromic/electrochemichromic rearview mirror assemblies including those using flat, curved or convex, or multi-radius glass, for use both inside or outside vehicles. The invention may be used on glass of varying thickness and composition thus offering improvements in weight or mirror cases. In addition, the invention is applicable to a variety of sizes and shapes which may be cut from the anti-reflective glass. Further, the invention is equally useful for electrochromic/electrochemichromic assemblies having a single front substrate or a laminate front element. Moreover, should it be desired not to dim below a certain level (such as 4%) of the incident light intensity, the anti-reflecting layers of the present invention allow use of a smaller amount of the electrochemichromic material providing more efficient, more economical assemblies while the mirror will continue to dim to the desired degree of darkness.

These and other objects, advantages, purposes and features of the invention will become more apparent from a study of the following description taken in conjunction with the drawings.

DESCRIPTION OF THE PREFERRED EMBODIMENTS

Figure 2:
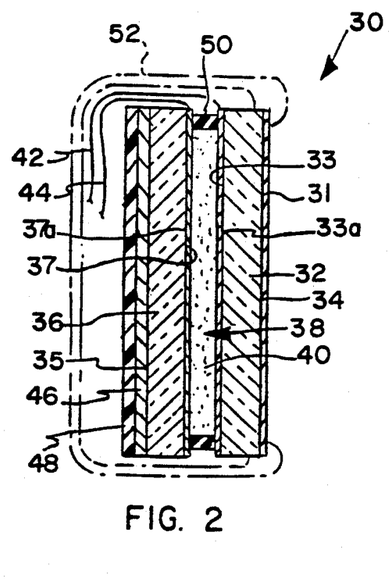
FIG. 2 is a sectional side elevation of a first embodiment of a reduced first surface reflectivity electrochromic/electrochemichromic rearview mirror assembly of the present invention incorporating an anti-reflective coating.

Referring now to the drawings in greater detail, FIG. 2 illustrates a first embodiment of a laminate, electrochromic/electrochemichromic rearview mirror assembly 30 having a front element 32 which incorporates an anti-reflective, optical thin film 34 on its front or first surface providing the improved, glare reducing and double image reducing benefits of the present invention. Front element or substrate panel 32 is a generally planar sheet of conventional soda lime window glass as is second glass substrate panel or element 36 which is spaced rearwardly from the front glass panel 32 to define a gap or space 38 for receiving an electrochemichromic medium 40 as explained below. Front element 32 includes generally parallel front and rear surfaces 31, 33 although the element may be flat, curved or convex, or incorporate a multi-radius curvature. Likewise, rear element 36 includes generally parallel front and rear surfaces 35, 37. As explained hereinafter, elements 32, 36 may also be resinous, polymeric sheets which prevent fragment scattering or lacerative injuries if broken as well as to reduce weight.

Gap or space 38 is formed between rear surface 33 of front glass element 32 and forward facing surface 37 of rear glass element 36. Preferably, front and rear surfaces 33, 37 are parallel and each is coated with a layer 33a, 37a of indium-tin oxide (ITO) which is substantially transparent to incident visible light yet is sufficiently electrically conductive to enable application of an electric field or voltage across space 38 between the ITO layers. Electrical energy is provided by wire leads 42, 44 secured in any one of several ways to the ITO coatings 33a, 37a as shown in FIG. 2 and as shown and described in co-pending, commonly assigned, U.S. patent application Ser. No. 07/454,398, filed Dec. 22, 1989, entitled "PERIMETER COATED, ELECTRO-OPTIC MIRROR," the disclosure of which is hereby incorporated by reference.

Rear surface 35 of glass panel 36 is preferably coated with a reflective layer 46 of metallic material such as aluminum, or a combination of silver and copper, or other materials as is conventionally known. Alternately, layer 46 may be applied to front surface 37 of element 36 in place of ITO coating 37a in which case layer 46 doubles as an electrically conductive coating. In either case, layer 46 provides a highly specular surface which reflects approximately 80 to 90% of the light incident thereon through layer 34, front and rear glass elements 32, 36, and electrochemichromic medium 40 in space or gap 38 as is described above. A layer 48 of tape or a plastisol-type plastic adhesive, typically about 0.1 millimeter thick, may be applied to the rear surface of reflective coating 46 to prevent scattering of glass fragments from the rear glass element in the event of breakage or damage during a collision in a vehicle. Layer 48 may be opaque, translucent or transparent since it is behind reflective coating 46 and need not transmit or reflect any light.

In order to confine and retain the electrochromic-/electrochemichromic medium 40 in gap 38, a peripheral seal 50, formed from an epoxy material which adheres well to the ITO coatings 33a, 37a, is applied adjacent the periphery of the glass panels 32, 36. A suitable epoxy sealing material is EPON 828 TM from Shell Chemical Company of Houston, Tex., cured by polyamide based curing agents such as V-40 TM from Miller Stephenson Company of Danbury, Conn. The epoxy is preferably silk-screened onto the ITO coated surface 33a of front glass element 32, or the ITO coated rear surface 37a of rear glass element 36, or onto both glass elements. The corresponding glass panel is then placed face-to-face with the still tacky epoxy. Seal 50 is then fully cured, typically by placing the assembly in an oven at 110° C. for three hours. Gap 38 can then be filled by a variety of means such as a simple injection of electrochemichromically active material using a syringe.

Assembly 30 is preferably incorporated in a molded thermoplastic or other mirror case 52 of conventional form and supported within a vehicle in a conventionally known manner through an articulated support from the inside windshield surface or from a header mounted support arm (not shown). Alternately, the assembly may be mounted on a backing support and secured within an exterior housing for use as an outside mirror in vehicles.

Typically, glass panels 32, 36 will each be approximately 2 millimeters in thickness (within the range of about 0.06 to 0.09 inch) while ITO coatings 33a, 37a will have a typical thickness of 1500 angstroms. Reflective coating 46 may have a thickness within the range of between about 500 and 1000 angstroms. Gap 38 is typically within the range of 50 to 200 microns for electrochromic/electrochemichromic mirrors, and may contain a liquid, thickened liquid, gel or semi-solid material such as the formulations described in U.S. Pat. No. 3,806,229 to Schoot et al. Alternately, in electrochromic mirrors, a material such as poly-AMPS TM available from Lubrizol Corp. of Wickliffe, Ohio may be used. For these, a liquid, thickened liquid, gel or semi-solid material may also be used as is conventionally known. Application of an electric field will cause media 40 to color to successively darker colors or shades as larger voltages are applied. When the voltage is turned off or reversed, the coloring is bleached allowing full transmittance of light and, hence, full reflectivity from reflective layer 46.

Preferably, anti-reflective layer or coating (AR) 34 is an optical thin film such as a thin layer of magnesium fluoride ($MgF_2$) having a refractive index of about 1.38 at 600 nm and deposited at a thickness of about 1075 angstroms onto the planar front surface 31 of glass panel 32. When light is incident in air on the front surface of such coated glass at 22.5°, which is typical for standard measurement of reflection from rearview mirrors under SAEJ964a, the reflectivity FR of the coated surface is 1.4% of the incident light as viewed by the human eye as shown in FIG. 8. When contrasted with the uncoated soda lime glass a shown in FIG. 7, when light is incident in air at the same angle, the first surface reflection FR is approximately 4.2% of the incident light intensity. The reflectivity for such a single layer may be calculated using the following equation where $n_1$ is the refractive index of the anti-reflective coating layer, $t_1$ is the thickness of such layer, and $n_s$ is the refractive index of the substrate glass. When $n_1 \cdot t_1 = \lambda/4, 3\lambda/4, 5\lambda/4$, etc., the reflectivity is either a maximum or minimum at wavelength $\lambda$ and is given by $$R = \left[\frac{n_1^2 - n_o n_s}{n_1^2 + n_o n_s}\right]^2$$

Figure 7:
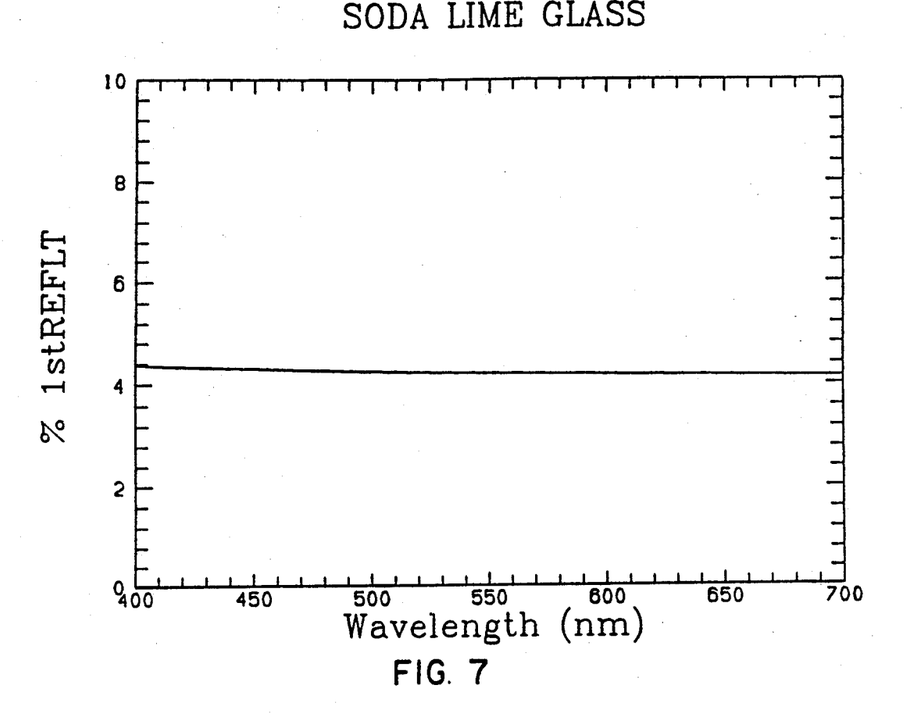
FIG. 7 is a graph showing the first surface reflection of conventional soda lime glass in the visible spectrum for light incident in air at 22.5° to the front surface of the glass element and measured with a photopic detector.
Figure 8:
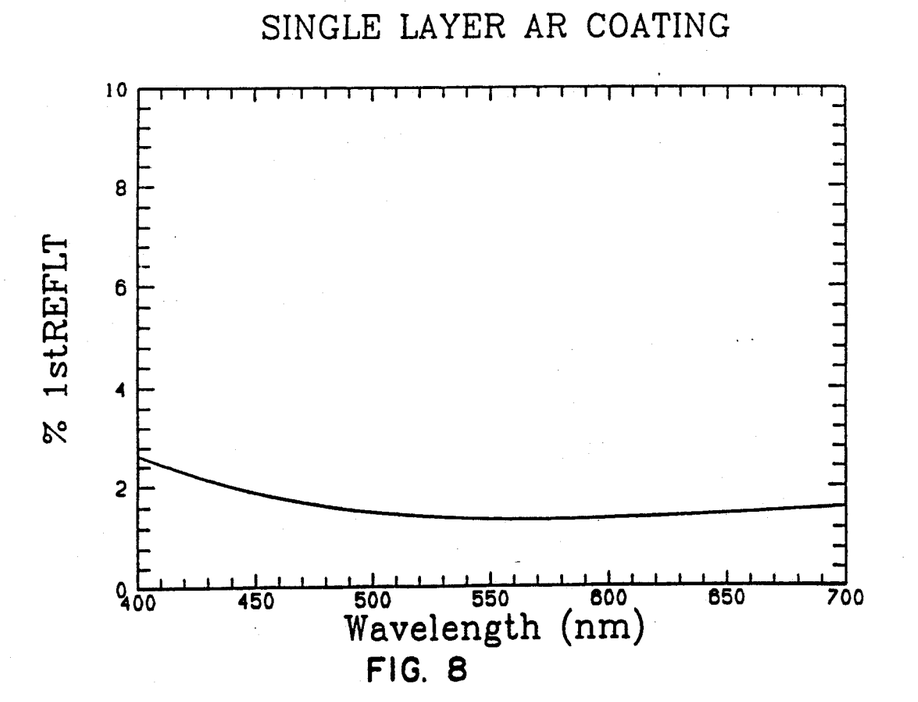
FIG. 8 is a graph illustrating the first surface reflection in the visible spectrum for soda lime glass coated with a single layer anti-reflective coating of magnesium fluoride for light incident in air at 22.5° to the front surface of the element.

The above measurements of integrated reflectivity from the data in FIGS. 7 and 8, as well as those in FIGS. 9-13, were taken using Standard Illuminant A and a photopic detector.

For a single layer anti-reflective coating whose reflectance is governed by the above equation, reflectivity is 0 if:

$$n_1 = \sqrt{n_o n_s}$$

For soda lime glass, this requires $n_1$ to be 1.23. Coatings favorably approaching such a refractive index besides magnesium fluoride include thin cryolite ($Na_3AlF_6$) coating, with a refractive index of 1.35 at 600 nm. However, magnesium fluoride ($MgF_2$) is preferred due to its good physical durability making it useful on the exposed front surface of a rearview mirror assembly.

Figure 9:
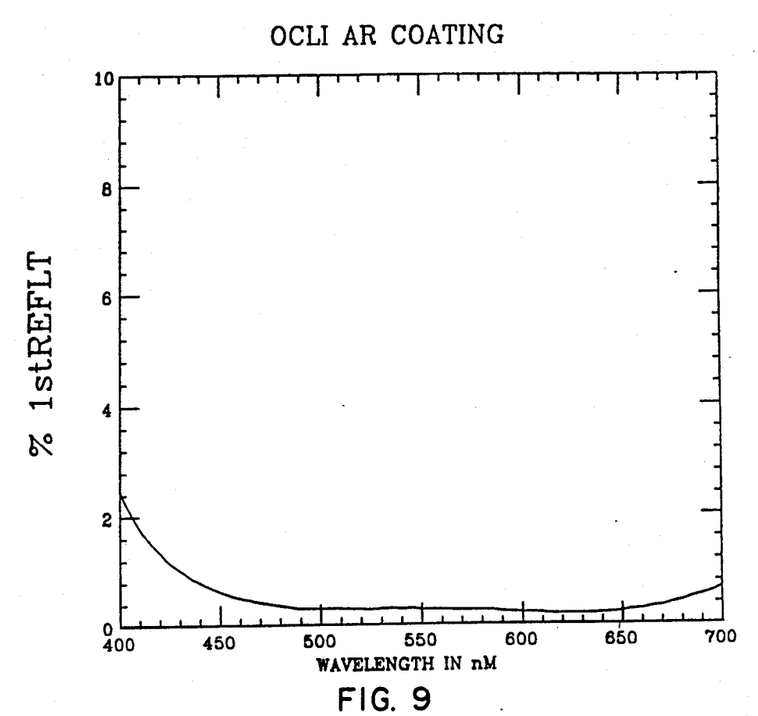
FIG. 9 is a graph showing the first surface reflection in the visible spectrum of a commercially available, anti-reflective coated soda lime glass element from OCLI, Inc. for light incident in air at 22.5° to the front surface of the element prior to any exposure to heat treatment.

Alternately, in place of the above single layer anti-reflective coatings, glass which has already commercially been anti-reflection coated may be used in the present invention. For example, anti-reflective coated glass under the trademark HEA is available from OCLI, Inc. of Santa Rosa, Calif. Such coated glass, as shown in FIG. 9, has an average front surface reflection of 0.3% when viewed by the human eye for light incident in air from Standard Illuminant A as measured with a photopic detector at 22.5°. Likewise, anti-reflective glass manufactured by the dip/fire sol-gel process by Denton Vacuum Inc. of Cherry Hill, N.J. under the trademark DENGLAS can be used. Such dip/fire coated glass is conveniently supplied anti-reflection coated on both sides of the substrate. Alternately, anti-reflective glass manufactured by Evaporated Metal Films of Ithica, N.Y. under the trademark MLAR can be used. Also, anti-reflective glass manufactured by LOF Inc. of Brackenridge, Pa. under the trademark SLR may be used. Front glass panel 32 may be cut from such coated glass and, thereafter, provided with a transparent electrically conductive coating on its opposite surface and assembled into assembly 30. Alternately, the glass may be cut and assembled as a laminate front glass element as will be described more fully below in connection with FIG. 3. The commercial availability of such glass, which can be easily cut for use in such assemblies, considerably lessens the expense of these assemblies.

Through use of an anti-reflective coating such as that at 34 in embodiment 30, the first surface reflectance FR is now small, i.e., about 0.5% of the incident light $I_o$, while the overall electrochemichromic mirror assembly can now potentially dim to as low as 0.5% of the incident light. Also, because the front surface reflection FR is now so weak, any double imaging between FR and R or R' is significantly less noticeable and of minimal concern.

EXAMPLE

Figure 10:
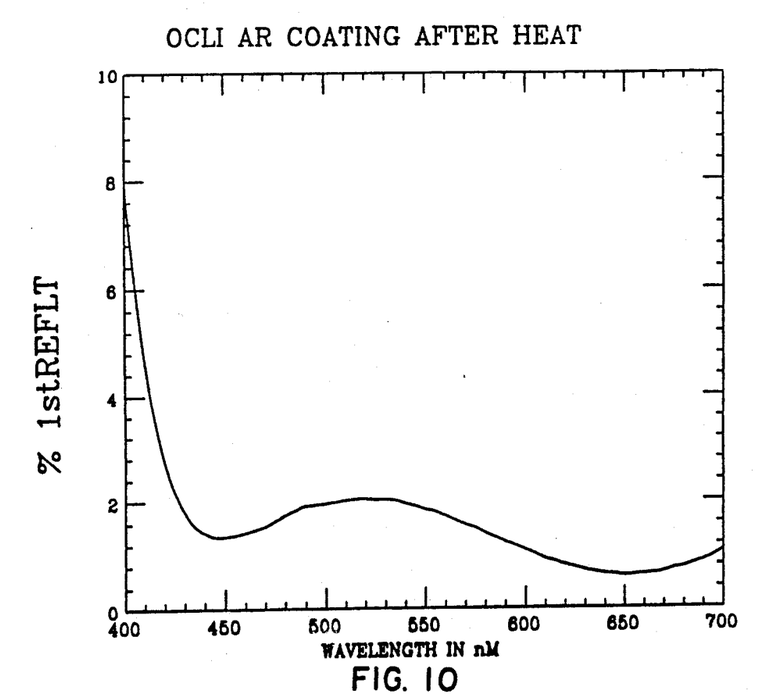
FIG. 10 is a graph showing the first surface reflection of a commercially available anti-reflective coated soda lime glass substrate from OCLI, Inc. following heat treatment in a reducing atmosphere at 450° C. for several hours during which the opposite side of the substrate was being coated with indium-tin oxide.

Two equivalent electrochemichromic cells were constructed, one incorporating plain 0.063 inch thickness soda lime glass as the front element 32 while another using 0.087 inch glass having a commercially available, HEA ™ anti-reflective coating from OCLI, Inc. as described above was used. The reflectance performance of the anti-reflective coated glass, after heat treating during coating with ITO as a transparent electrically conductive coating was modified because of such processing and is shown in FIG. 10.

Specifically, before coating with ITO, the first surface reflectance of the OCLI HEA ™ anti-reflective coated glass as shown in FIG. 9 was about 0.3% of the incident light from Standard Illuminant A as viewed with the human eye. However, application of the ITO coating requires heat treatment in a reducing atmosphere at high temperature. Typically, such treatment requires soaking for several hours at approximately 450° C. in a reducing atmosphere which changes the thin film stack already applied to the glass when purchased. Thus, after such treatment, first surface reflection had risen to 1.4% of the incident light (FIG. 10).

In the samples tested, the second glass substrate panels 36 were 0.063 inch clear soda lime glass. The transparent conductors 33a, 37a were 1500 angstrom ITO coatings of sheet resistance at 15 ohms/square in the conventional sample and 3000 angstroms of sheet resistance at 10 ohms/square in the anti-reflective coated sample. The epoxy resin seal 50 of 150 microns thickness was used in each sample. The rear reflective coating 46 in each case was silver. The cell space 38 in each sample was filled with an electrochemichromic solution comprising 0.05 molar benzylviologen tetrafluoroborate, 0.05 molar 5,10-dihydro-5,10-dimethylphenazine, and 0.05 molar tetrabutylammonium tetrafluoroborate dissolved in propylene carbonate. As shown in Table A, the optical performance of the two sample mirrors, as made in accordance with the above, differed significantly.

TABLE A

Comparison of anti-reflection coated electrochemichromic device to a conventional electrochemichromic device

|  | Zero V applied High Reflectance State | 1.2 V applied Low (dimmed) Reflectance State |
| --- | --- | --- |
| Conventional | 76% $I_o$ | 5.2% $I_o$ |
| Anti-reflective coated | 71.5% $I_o$ | 2.1% $I_o$ |

As shown in Table A, when 1.2 volts is applied across conductive leads 42, 44, the electrochemichromic medium 40 is colored dark and the mirror assembly reflects approximately 5.2% of the incident light (Standard Illuminant A) comprising about 4.2% from front surface FR reflection and 1% due to reflection from reflective layer 46 and any secondary reflections. However, in the anti-reflective coated assembly, total reflectivity measured 2.1% of the incident light comprising only about 1.4% reflectivity from the front surface FR adding to less than 1% reflectivity from the rear reflective layer 46 and any secondary reflections. In addition, double imaging due to front surface reflection was noticeably and beneficially reduced in the anti-reflective coated assembly.

Figure 3:
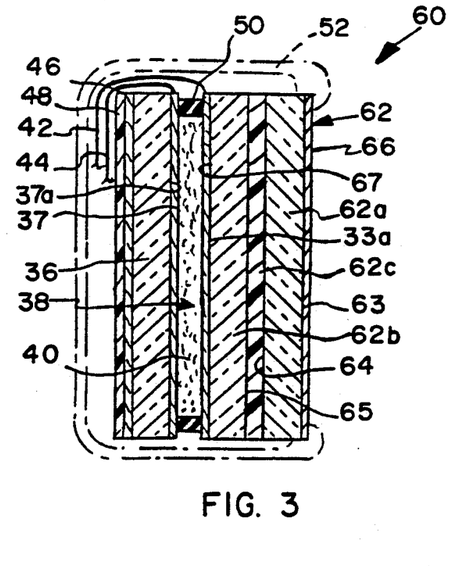
FIG. 3 is a sectional side elevation of a second embodiment of the reduced first surface reflectivity electrochromic/electrochemichromic rearview mirror assembly of the present invention including a laminate front glass element and an anti-reflective coating thereon.

A second form of the reduced reflectivity rearview mirror assembly is shown at 60 in FIG. 3 where like numerals indicate like parts to those of embodiment 30. The principal difference between embodiments 30 and 60 is that a multi-substrate, laminate first element 62 is substituted for the single glass substrate panel 32 of embodiment 30. In embodiment 60, front laminate glass assembly 62 has a front or first glass element 62a with generally parallel front and rear surfaces, adhered to an intermediate glass element 62b, also having parallel front and rear surfaces, preferably by an interlayer 62c of a polymeric substance such as polyvinylbutyral (PVD) commercial laminating sheeting or a highly optically transparent adhesive layer having a moderate to low modulus of elasticity and an index or refraction closely matched to that of the elements/panels laminated thereby as disclosed in co-pending, commonly assigned U.S. patent application Ser. No. 07/464,888 incorporated by reference above. Layer 62c is adhered to rear surface 64 of front glass panel 62a and front surface 65 of glass panel 62b by heat and pressure when PVB laminating sheeting is used such as with a conventionally known autoclave method or the like. Glass panels 62a, 62b may be conventional soda lime window glass as in embodiment 30. The rear surface 67 of glass element 62b is coated with an ITO coating layer 33a just as in embodiment 30. However, as explained below, by avoiding heating treatment during coating of the anti-reflective coated, front glass element 62a during separate coating of surface 37 of glass element 62b with ITO, improved anti-reflective characteristics are provided.

ITO coated rear surface 67 of glass panel 62b is, in turn, sealed with the front ITO coated surface 37a of rear glass panel 36 by epoxy resin seal 50 as described above to provide gap 38. Front glass panel 62a also includes a single layer, anti-reflective coating of magnesium fluoride, thin cryolite, or commercially available HEA ™ or DENGLAS ™ coatings from OCLI, Inc. or Denton Vacuum Inc. as described above as in embodiment 30.

As described in co-pending, commonly assigned U.S. patent application Ser. No. 07/464,888, the inclusion of laminate front glass assembly 62 provides significant safety advantages protecting vehicle occupants from injury due to scattered shards of glass and fragments should an accident occur. In addition, as described in Ser. No. 07/464,888, the front glass assembly may provide ultraviolet radiation reducing benefits such as UV reducing coatings on the front surface 63 of the assembly, UV reducers/absorbers incorporated in or made a part of interlayer 62c or as part of the glass panels or elements themselves, all as described in Ser. No. 07/464,888. When using such a laminate front assembly 62, the chances for misalignment of the anti-reflective coated front surface 63 with the rear coated reflective layer 46 are increased through the various manufacturing/assembly processes. Thus, in an uncoated, nonanti-reflective treated electrochemichromic rearview mirror assembly, double imaging could be significantly pronounced as compared with the present invention. Therefore, electrochemichromic assemblies using laminate front glass elements are significantly more commercially feasible and acceptable when including the anti-reflective coatings or layers of the present invention.

Use of a laminated front element in assembly 60 has yet another advantage. As described above, many commercially available and other anti-reflective coatings are highly vulnerable to heat treatment. Such treatment can cause changes in the refractive index of such layers and can degrade their anti-reflective performance. Even small refractive index changes can significantly degrade anti-reflective performance. Small changes in both the index of refraction and thickness of an anti-reflective coating are possible when such coatings are heated, particularly at high temperatures such as 450° C. in a reducing atmosphere for several hours as is common in the coating and curing of a transparent electrically conductive film such as ITO. Yet, it is often most convenient to purchase commercially available, anti-reflective coated glass and then apply transparent electrically conductive coatings thereto on the opposite surfaces. On the other hand, if one applies transparent electrically conductive coatings to glass and then applies anti-reflective coatings to other surfaces of such glass, the deposition conditions involved in applying the anti-reflective layers can also degrade the conductivity of the existing transparent electrically conductive coatings. Use of a laminate front element in embodiment 60 of FIG. 3 eliminates this problem because the front glass panel 62a can be anti-reflective coated separately from the second or intermediate ITO coated glass panel or element 62b. When separately formed and thereafter assembled via lamination or the like, both panels can be used in their optimum performance conditions eliminating either reduced electrical performance or reduced anti-reflective performance.

As an example of such optimum performance, an anti-reflective, coated glass element bearing a commercially available OCLI HEA ™ coating as described above in connection with Table A but without any prior heat treatment was laminated to the uncoated front surface of a rear ITO coated glass piece such as 62b in FIG. 3. Lamination was made using low modulus, optically matching UV curing, polyurethane adhesive available from Norland Products Inc. of New Brunswick, N.J. under the trademark NORLAND OPTICAL ADHESIVE 65. When measured, the assembly incorporating this laminated front piece had an undimmed reflectivity of 77.5% of the incident light, yet dimmed to a very low reflectivity of only 1.9% of the incident light when 1.2 volts were applied.

Alternately, excellent anti-reflective performance can be obtained with either rearview mirror embodiment 30 or 60 by substituting multiple layer anti-reflective coatings to achieve a lower reflectivity over a wider spectral region than is achievable using single layer coatings such as magnesium fluoride or thin cryolite.

Figure 11:
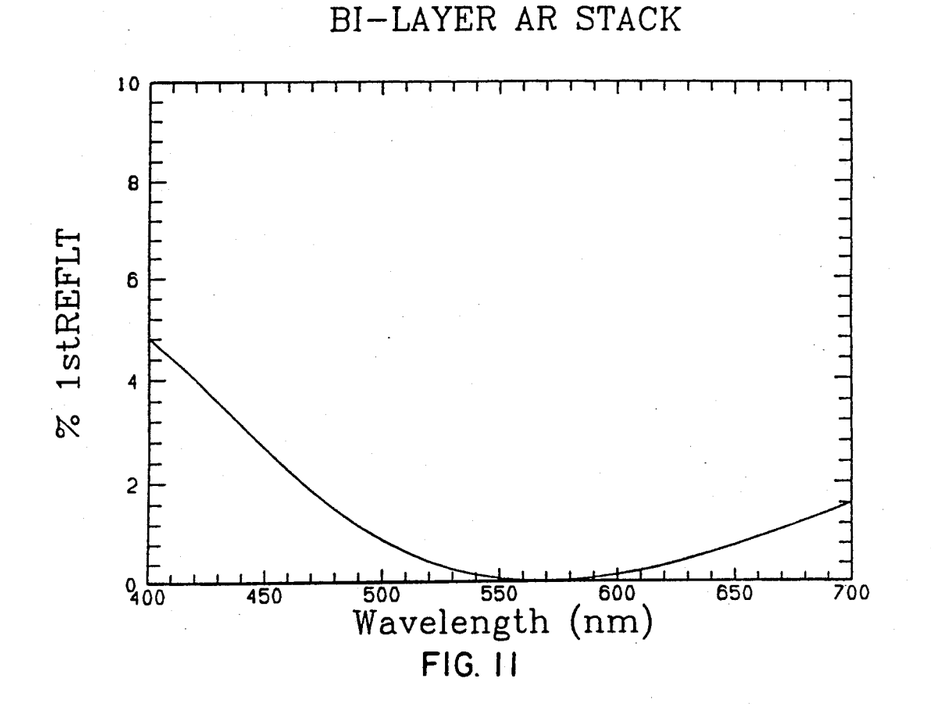
FIG. 11 is a graph showing the first surface reflection in the visible spectrum for soda lime glass coated with a double layer anti-reflective thin film stack of magnesium fluoride and silicon monoxide for light incident in air at 22.5° to the front surface of the coated element.

With reference to FIGS. 4 and 11, a double layer anti-reflective (AR) thin film stack may be provided using two, quarter wavelength coatings 70, 72 where, for zero reflection, $$\frac{n_2}{n_1} = \left(\frac{n_s}{n_o}\right)^{\frac{1}{2}}$$

where $n_1$ and $n_2$ are the indices of refractions of the lower index, outermost layer ($n_1$) and the higher index, innermost layer ($n_2$) in the stack. As shown in FIG. 4, a double layer of coatings may be provided on the front surface of glass substrate panel 32 or 62a. The outermost layer 70 may comprise a 1068 angstrom magnesium fluoride ($MgF_2$) layer having a refractive index of 1.38. The innermost layer 72 is an 867 angstrom silicon monoxide ($SiO_x$) layer of refractive index of 1.7 deposited onto soda lime glass. First surface reflection FR for such coated glass when viewed with the human eye is reduced to about 0.25% of the incident light as shown in FIG. 11. Overall, an electrochromic/electrochemichromic rearview mirror assembly incorporating such double layer coated glass is capable of a total reflectivity of approximately 1% of the incident light when the electrochromic/electrochemichromic medium is fully and completely dimmed.

Figure 12:
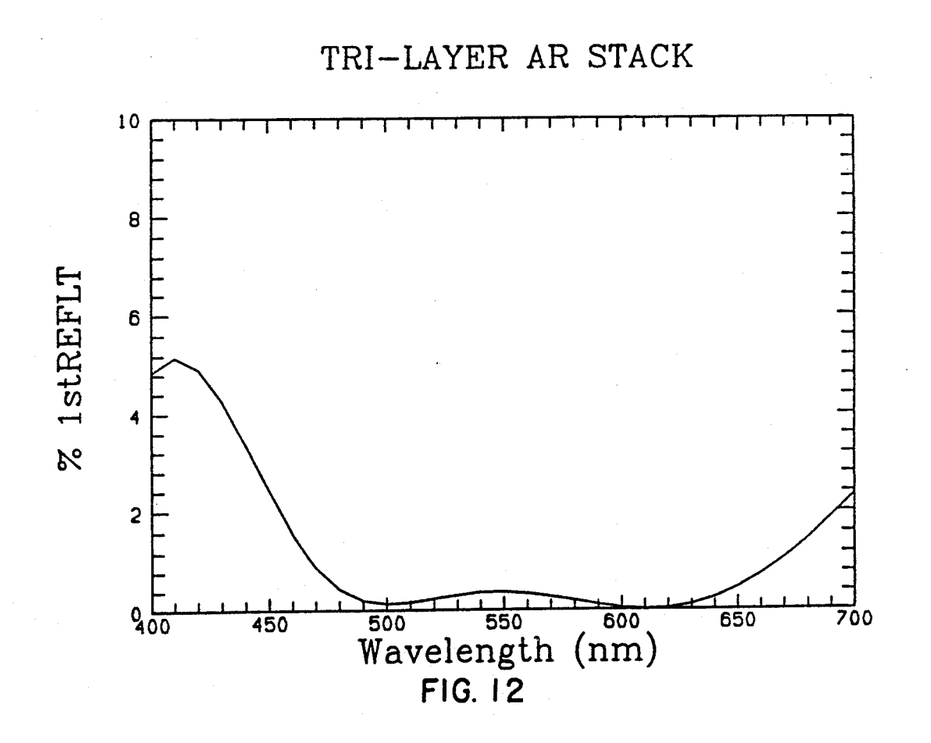
FIG. 12 is a graph showing the first surface reflection in the visible spectrum for soda lime glass coated with a triple layer thin film stack including magnesium fluoride, zirconium oxide and lanthanum oxide for light incident in air at 22.5° to the front surface of the coated element.

As shown in FIGS. 5 and 12, triple layer thin film stacks are also useful in the present invention. One such stack is taught in U.S. Pat. No. 3,185,020 to Thelen, the disclosure of which is hereby incorporated by reference. In such stack, the first or outermost layer 80 has an optical thickness of one-quarter wavelength of the design wavelength (about 560 nm for a rearview mirror), the second or middle layer 82 has an optical thickness of one-half wavelength, while the third or inner layer 84 has an optical thickness of one-quarter wavelength. The first, second and third layers 80, 82 and 84 are formed from three different materials having different indices of refraction, namely, $n_1$, $n_2$ and $n_3$, respectively. To assure good anti-reflecting performance, such indices are chosen so that:

$$n_1^2 = \frac{n_3^2}{n_s}$$

where $n_s$ is the index of refraction of the substrate glass. Moreover, the index of refraction of the second layer 82 ($n_2$) should be in the region of about 1.9 to 2.3 for an index of refraction for the substrate within the range of between 1.45 to 1.75. Of course, soda lime glass lies within such range at 1.52. Magnesium fluoride ($MgF_2$) is a suitable material for the outermost layer 80 ($n_1$) and has a low index of 1.38. The middle or second layer 82 has a high refractive index and can be chosen from zirconium oxide ($ZrO_2$), neodymium oxide ($Nd_2O_3$), tantalum oxide ($Ta_2O_5$), indium oxide ($In_2O_3$), titanium dioxide ($TiO_2$) and certain mixed oxides. The innermost layer 84 is of medium index of refraction between 1.8 and 1.85 and may consist of cerium fluoride ($CeF_2$), silicon oxide (SiO), lanthanum oxide ($La_2O_3$), thorium oxide ($ThO_2$) and/or neodymium fluoride $NdF_3$). Preferably, for soda lime glass, use of magnesium fluoride having an index of 1.38 for layer 80, zirconium oxide having an index of 1.95 for the layer 82, and lanthanum oxide having an index of 1.84 for the layer 84 is particularly satisfactory. A physical thickness of around 1014 angstroms for layer 80, 2200 angstroms for layer 82, and 761 angstroms for layer 84 is particularly satisfactory. Such a triple layer anti-reflection coating has an integrated first surface reflectance below about 0.5% of the incident light as shown in FIG. 12.

Figure 13:
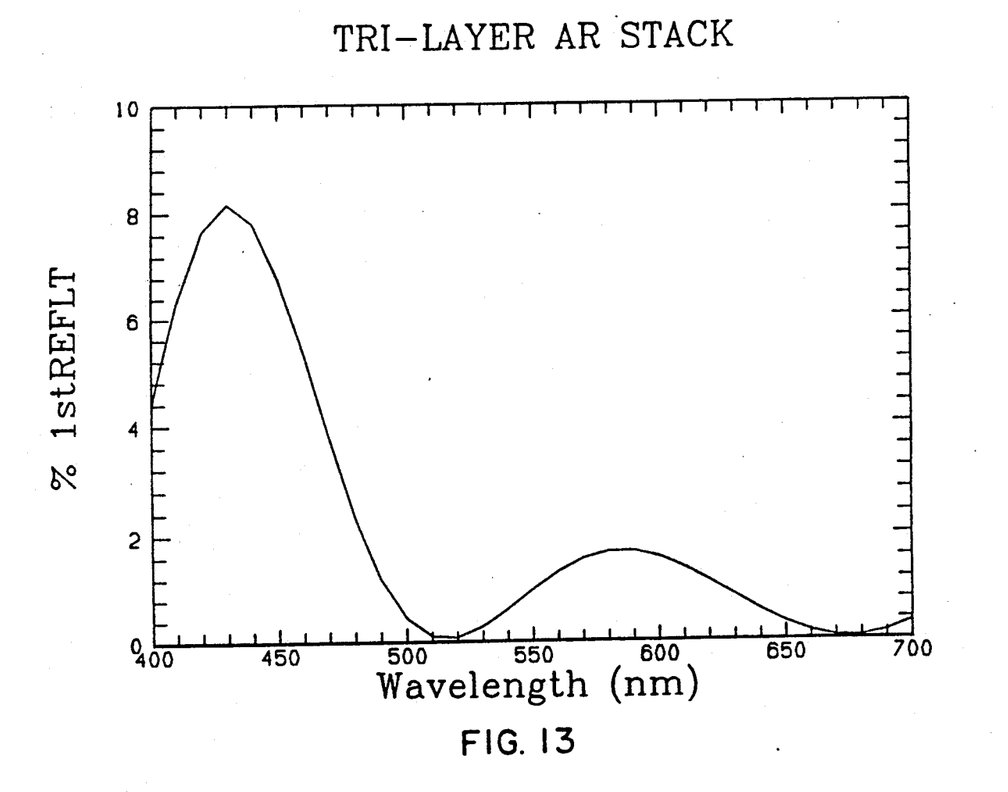
FIG. 13 is a graph showing the first surface reflection of a triple layer thin film stack on soda lime glass wherein the layers are the same as those shown in FIG. 12 and the light is incident in air at 22.5° to the front surface but where the indices of refraction for each layer are increased by 0.1 such as could occur in heat treatment during the application of an ITO or similar coating.

With reference to FIG. 13, the reflectance performance of a similar triple layer thin film stack having indices of refraction artificially increased by only 0.1 in each layer while thicknesses remain the same is shown. The integrated reflectance increases from the original 0.25% of incident light to 1.14% of the incident light due to these small index changes. Such changes could occur through heating as in the process for applying ITO coatings. Therefore, use of laminated front glass assemblies such as that shown at 62 in embodiment 60 can significantly increase anti-reflective performance when such processing is avoided.

It is also possible to use four or more layered anti-reflective coatings in the assemblies of the present invention. A four layer coating is described, for example, in U.S. Pat. No. 3,432,225 to Rock, the disclosure of which is hereby incorporated by reference. As described in that patent, such a four layer coating consists as shown in FIG. 6, when counting from the air side, of a quarter wavelength low index layer 90 such as magnesium fluoride ($MgF_2$), a half wavelength high index layer 92 such as zirconium oxide ($ZrO_2$), and two thin layers 94, 96 used to synthesize a layer having an optical thickness of one-quarter wavelength of intermediate refractive index. This is achieved by depositing layer 96 of a high index material such as zirconium oxide to an optical thickness substantially less than one-quarter wavelength of the design wavelength for the anti-reflection coating onto the soda lime glass substrate, followed by another layer 94 of a material such as magnesium fluoride having a low index of refraction to a thickness also substantially less than one-quarter of the design wavelength. The effect achieved by these two thin layers is a layer of intermediate index of refraction between 1.45 and 1.76 and having an optical thickness of one-quarter of the design wavelength. Suitable four layer anti-reflective coatings of specific designs are also taught in Sumita U.S. Pat. No. 3,781,090, the disclosure of which is also incorporated by reference herein.

As an alternative to the deposition of thin film coatings onto a glass surface to reduce reflection from that surface, a refractive index gradient can be provided at the surface. Numerous techniques may be used such as those disclosed in an article entitled "Integral antireflection films for glasses: a review" by Ford et al., Glass Technology, Volume 26, No. 2, April, 1985 at pages 104–107. Such anti-reflecting surfaces are generally produced by some form of acid etching technique, using strong mineral acids such as a solution of $NH_4F \cdot HF$ and $HNO_3$, and generally consist of a surface leached layer of intermediate index of refraction between that of air and the bulk glass. Frequently, the anti-reflective gradient index layer is a porous silica-rich region with a refractive index of between about 1.35 and 1.45.

For example, Minot, in an article published in the Journal of the Optical Society of America, Volume 66, No. 6, June, 1976 at page 515, describes single layer, gradient refractive index films effective in the wavelength region from 0.35 to 2.5 microns in thickness produced by first heat treating borosilicate glasses to effect a phase separation into a relatively insoluble silica-rich phase and into a soluble low silica content phase. The soluble phase is subsequently readily dissolved by a variety of means, including most of the mineral acids, leaving the high silica content phase as a porous, skeletonized, anti-reflecting surface film of lowered, refractive index compared to that of the bulk glass.

Alternately, Thomas in U.S. Pat. No. 4,446,171, the disclosure of which is hereby incorporated by reference, describes a porous skeletonized surface coating imparted to a glass substrate by a sol-gel process including dip application of a thin, anti-reflective coating by providing a dispersion containing at least on metallo-organic compound and at least one organic polymer in a solvent, followed by heating such that the solvent, the organic polymer, and the organic components are driven off leaving a surface coating as an inorganic oxide film having a relatively low refractive index.

Alternately, anti-reflective layers can be induced on soda lime glass by argon ion implantation as described by F. Geotti-Mianchini et al. in the Journal of the American Ceramic Society, Volume 67, No. 1, January, 1984, pages 39–42, the disclosure of which is hereby incorporated by reference herein. Selection of a particular anti-reflecting coating or layer, thin film coating, selective surface etch, ion implantation or dip/heating technique in the present invention is made by the performance required, the cost target sought, and the degree of durability desired.

In the dip and heating process, the glass elements or panels are immersed in a mineral acid solution such that both surfaces of a glass sheet, such as surfaces 31 and 33 in embodiment 30, are simultaneously and beneficially anti-reflection coated. The broad band reflectance of two surfaces is effectively reduced from about 8% to less than 0.5% of the incident light.

As will also be apparent, the anti-reflective layers described above can be deposited either on flat or curved glass thus enabling use on all types of mirrors, both inside and exterior vehicular mirrors, including flat, convex or multi-radius mirrors. Also, the glass substrates can be made as thin as desired to decrease weight or reduce the size of necessary mirror cases or other packaging. Also, the sizes and shapes of mirrors incorporating the anti-reflective coatings or layers of the present invention can be cut from commercially available, anti-reflective coated glass sheet to reduce expense.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A reduced first surface reflectivity electrochromic/electrochemichromic rearview mirror assembly comprising:

first and second spaced, optically transparent elements mounted in a mirror case, said elements each having front and rear surfaces and defining a space between the rear surface of said first element and the front surface of said second element;

an electrochromic/electrochemichromic medium confined in said space whose light transmittance is variable upon the application of an electric field thereto;

means for applying an electric field to said electrochromic/electrochemichromic medium to cause variation in the light transmittance of said medium;

a reflective coating on one surface of said second element adapted to reflect light incident thereon through said first element and said electrochromic-/electrochemichromic medium; and anti-reflective layer means on said front surface of said element for substantially reducing reflection from said front surface of said first element whereby said assembly provides lower total reflectivity and reduced double imaging.

2. The mirror assembly of claim 1 wherein said anti-reflective layer means include an optical thin film.

3. The mirror assembly of claim 2 wherein said first element is soda lime glass; said optical thin film being a coating selected from the group consisting of magnesium fluoride ($MgF_2$) and cryolite ($Na_3AlF_6$).

4. The mirror assembly of claim 1 wherein said anti-reflective layer means include a multiple layer coating.

5. The mirror assembly of claim 4 wherein said multiple layer coating includes a thin film stack having three layers.

6. The mirror assembly of claim 5 wherein said three layer stack includes first and third layers, when progressing inwardly from the outermost layer toward said first element front surface, of thicknesses less than the second of said three layer stack; said first, second and third layers each having different indices of refraction wherein said index of refraction for said first layer is lower than said second layer, said third layer having an index of refraction intermediate the indices of said first and second layers.

7. The mirror assembly of claim 6 wherein said first element is soda lime glass; said first layer is magnesium fluoride ($MgF_2$); said second layer is selected from the group consisting of zirconium oxide ($ZrO_2$), neodymium oxide $Nd_2O_3$, tantalum oxide ($Ta_2O_5$), indium oxide ($In_2O_3$) and titanium dioxide ($TiO_2$); and said third layer is selected from the group consisting of cerium fluoride ($CeF_2$), silicon oxide (SiO), lanthanum oxide ($La_2O_3$), thorium oxide ($ThO_2$) an neodymium fluoride ($NdF_3$).

8. The mirror assembly of claim 6 wherein said first layer has an index of refraction of about 1.38, said second layer has an index of refraction within the range of about 1.9 to 2.3, and said third layer has an index of refraction within the range of about 1.8 to 1.85.

9. The mirror assembly of claim 4 wherein said multiple layer coating includes a thin film stack having two layer.

10. The mirror assembly of claim 9 wherein said two layer stack includes as first, outermost layer having an index of refraction lower than said second, innermost layer.

11. The mirror assembly of claim 10 wherein said first element is soda lime glass; said first, outermost layer having an index of refraction of about 1.38; said second, innermost layer having an index of refraction of about 1.7.

12. The mirror assembly of claim 11 wherein said first, outermost layer is magnesium fluoride ($MgF_2$); said second layer being silicon monoxide ($SiO_x$).

13. The mirror assembly of claim 4 wherein said multiple layer coating includes a thin film stack having four layers.

14. The mirror assembly of claim 13 wherein said four layer stack includes first, third and fourth layers, when progressing inwardly from the outermost layer toward said first element front surface, of thicknesses less than the second of said four layers; said first and third layers having indices of refraction less than said second and fourth layers.

15. The mirror assembly of claim 14 wherein said first element is soda lime glass; said first and third layers are magnesium fluoride ($MgF_2$); and said second and fourth layers are zirconium oxide ($ZrO_2$).

16. The mirror assembly of claim 1 wherein said anti-reflection layer means include a gradient refractive index film.

17. The mirror assembly of claim 16 wherein said first element also includes a gradient refractive index film on the rear surface thereof.

18. The mirror assembly of claim 16 wherein said gradient refractive index film includes a surface leached layer having an index of refraction intermediate that of air and soda lime glass.

19. The mirror assembly of claim 18 wherein said gradient refractive index layer is a porous silica-rich region formed with acid etching and having an index of refraction of between about 1.35 and 1.45.

20. The mirror assembly of claim 18 wherein said first element is glass; said gradient refractive index layer being a porous, skeletonized surface coating on said glass first element formed from a dispersion including a solution having at least one metallo-organic compound and at least one organic polymer, the dispersion being applied by dip application followed by heating to drive off the solvent, the organic components, and said organic polymer and leaving said surface coating as an inorganic oxide film.

21. The mirror assembly of claim 18 wherein said first element is glass; said gradient refractive index layer being induced o said front surface of said glass first element by argon-ion implantation.

22. The mirror assembly of claim 1 wherein said first element is a laminate assembly including a pair of optically transparent panels adhered to one another by a highly light transmitting interlayer therebetween; said panels each having front and rear surfaces which are generally parallel to one another on each element.

23. The mirror assembly of claim 22 wherein each of said pair of panels is formed from glass, said interlayer being selected from the group including a polymer layer and a highly transparent adhesive layer having a moderate to low modulus of elasticity.

24. The mirror assembly of claim 23 wherein said laminate first element assembly includes ultraviolet radiation reducing means for reducing ultraviolet radiation degradation of said electrochemichromic medium in said assembly.

25. A reduced first surface reflectivity electrochromic/electrochemichromic rearview mirror assembly comprising:

first and second spaced, optically transparent elements mounted in a mirror case, said elements each having front and rear surfaces and defining a space between the rear surface of said first element and the front surface of said second element;

said first element being a laminate assembly including a pair of optically transparent panels adhered to one another by a highly light transmitting interlayer therebetween; said panels each having front and rear surfaces which are generally parallel to one another on each element;

an electrochromic/electrochemichromic medium confined in said space whose light transmittance is variable upon the application of an electric field thereto;

means for applying an electric field to said electrochromic/electrochemichromic medium to cause variation in the light transmittance of said medium;

a reflective coating on one surface of said second element adapted to reflect light incident thereon through said first element and said electrochromic/electrochemichromic medium; and anti-reflective layer means on said front surface of said first element for substantially reducing reflection from said front surface of said first element whereby said assembly provides lower total reflectivity and reduced double imaging.

26. The mirror assembly of claim 25 wherein said reflective coating is metallic and is on said front surface of said second element, is in contact with said electrochromic/electrochemichromic medium, and forms a portion of said means for applying an electric field to said electrochromic/electrochemichromic medium.

27. The mirror assembly of claim 25 wherein said reflective coating is on said rear surface of said second element.

28. The mirror assembly of claim 25 wherein each of said pair of panels is formed from glass, said interlayer being selected from the group including a polymer layer and a highly transparent adhesive layer having a moderate to low modulus of elasticity.

29. The mirror assembly of claim 28 wherein said electrochromic/electrochemichromic medium is a solution comprising 0.05 molar benzylviologen tetrafluoroborate, 0.05 molar 5,10-dihydro-5,10-dimethylphenazine, and 0.05 molar tetrabutylammonium tetrafluoroborate dissolved in propylene carbonate.

30. The mirror assembly of claim 25 wherein said anti-reflective layer means include an optical thin film.

31. The mirror assembly of claim 30 wherein said first element is soda lime glass; said optical thin film being a coating selected from the group consisting of magnesium fluoride ($MgF_2$) and cryolite ($Na_3AlF_6$).

32. The mirror assembly of claim 25 wherein said anti-reflective layer means include a multiple layer coating.

33. The mirror assembly of claim 32 wherein said multiple layer coating includes a thin film stack having three layers.

34. The mirror assembly of claim 33 wherein said three layer stack includes first and third layers, when progressing inwardly from the outermost layer toward said first element front surface, of thicknesses less than the second of said three layer stack; said first, second and third layers each having different indices of refraction wherein said index of refraction for said first layer is lower than said second layer, said third layer having an index of refraction intermediate the indices of said first and second layers.

35. The mirror assembly of claim 34 wherein said first element is soda lime glass; said first layer is magnesium fluoride ($MgF_2$); said second layer is selected from the group consisting of zirconium oxide ($ZrO_2$), neodymium oxide ($Nd_2O_3$), tantalum oxide ($Ta_2O_5$), indium oxide ($In_2O_3$) and titanium dioxide ($TiO_2$); and said third layer is selected from the group consisting of cerium fluoride ($CeF_2$), silicon oxide (SiO), lanthanum oxide ($La_2O_3$), thorium oxide ($ThO_2$) and neodymium fluoride ($NdF_3$).

36. The mirror assembly of claim 34 wherein said first layer has an index of refraction of about 1.38, said second layer has an index of refraction within the range of about 1.9 to 2.3, and said third layer has an index of refraction within the range of about 1.8 to 1.85.

37. The mirror assembly of claim 32 wherein said multiple layer coating includes a thin film stack having two layer.

38. The mirror assembly of claim 37 wherein said two layer stack includes a first, outermost layer having an index of refraction lower than said second, innermost layer.

39. The mirror assembly of claim 38 wherein said first element is soda lime glass; said first, outermost layer having an index of refraction of about 1.38; said second, innermost layer having an index of refraction of about 1.7.

40. The mirror assembly of claim 39 wherein said first, outermost layer is magnesium fluoride ($MgF_2$); said second layer being silicon monoxide ($SiO_x$).

41. The mirror assembly of claim 32 wherein said multiple layer coating includes thin film stack having four layers.

42. The mirror assembly of claim 41 wherein said four layer stack includes first, third and fourth layers, when progressing inwardly from the outermost layer toward said first element front surface, of thicknesses less than the second of said four layers; said first and third layers having indices of refraction less than said second and fourth layers.

43. The mirror assembly of claim 42 wherein said first element is soda lime glass; said first and third layers are magnesium fluoride ($MgF_2$); and said second and fourth layers are zirconium oxide ($ZrO_2$).

44. The mirror assembly of claim 25 wherein said anti-reflection layer means include a gradient refractive index film.

* * * * *

UNITED STATES PATENT AND TRADEMARK OFFICE
CERTIFICATE OF CORRECTION

PATENT NO. : 5,076,674

DATED : December 31, 1991

INVENTOR(S) : Niall R. Lynam

It is certified that error appears in the above-identified patent and that said Letters Patent is hereby corrected as shown below:

Column 1, line 34:
"scattering" should be --scatter--.

Column 1, line 68:
"surface 1" should be --surface 13--.

Column 4, line 43:
"on" should be --one--.

Column 4, line 49:
"argo" should be --argon--.

Column 8, line 5:
"a" should be --as--.

Column 10, line 22:
"or" should be --of--.

Column 14, line 8:
"on" should be --one--.

Column 15, claim 1, line 6:
After "said" insert --first--.

UNITED STATES PATENT AND TRADEMARK OFFICE
CERTIFICATE OF CORRECTION

PATENT NO. : 5,076,674

DATED : December 31, 1991

INVENTOR(S) : Niall R. Lynam

It is certified that error appears in the above-identified patent and that said Letters Patent is hereby corrected as shown below:

Column 15, claim 9, line 48:
"layer" should be --layers--.

Column 16, claim 21, line 33:
"o" should be --on--.

Column 18, claim 37, line 21:
"layer" should be --layers--.

Column 18, claim 41, line 35:
After "includes" insert --a--.

Signed and Sealed this

Sixth Day of July, 1993

Attest:

MICHAEL K. KIRK

*Attesting Officer*     Acting Commissioner of Patents and Trademarks